(12) United States Patent
Snow

(10) Patent No.: US 8,370,313 B2
(45) Date of Patent: Feb. 5, 2013

(54) SCORING NODES IN A DIRECTED GRAPH WITH POSITIVE AND NEGATIVE LINKS

(75) Inventor: James Matthew Snow, Hillsboro, OR (US)

(73) Assignee: James Snow, Beaverton, OR (US)

( * ) Notice: Subject to any disclaimer, the term of this patent is extended or adjusted under 35 U.S.C. 154(b) by 0 days.

(21) Appl. No.: 12/797,167

(22) Filed: Jun. 9, 2010

(65) Prior Publication Data

US 2011/0307494 A1    Dec. 15, 2011

Related U.S. Application Data

(60) Provisional application No. 61/185,959, filed on Jun. 10, 2009.

(51) Int. Cl.
  *G06F 17/00*    (2006.01)
  *G06F 17/30*    (2006.01)
(52) U.S. Cl. ........................................ 707/694; 707/798
(58) Field of Classification Search .................. 707/694, 707/798
See application file for complete search history.

(56) References Cited

U.S. PATENT DOCUMENTS

| | | | |
|---|---|---|---|
| 6,594,694 B1 * | 7/2003 | Najork et al. | 709/219 |
| 7,830,815 B1 * | 11/2010 | Koren et al. | 370/252 |
| 2008/0214148 A1 * | 9/2008 | Ramer et al. | 455/414.1 |
| 2009/0112989 A1 * | 4/2009 | Anderson et al. | 709/204 |
| 2010/0153404 A1 * | 6/2010 | Ghosh et al. | 707/748 |

* cited by examiner

*Primary Examiner* — Son T Hoang
(74) *Attorney, Agent, or Firm* — James Snow

(57) ABSTRACT

A method assigns a score to each node in a directed graph. Nodes in the graph represent autonomous entities, and links denote opinions entities hold of each other. Scores are assigned based on either a deterministic iterative method or a random walk. Both methods are able to take negative opinions into account by assigning negative reputation to a node in proportion to the positive reputation of the node that links to it with a negative opinion, and also assigning a separate kind of negative reputation to nodes that have a positive opinion of a node with either kind of negative reputation. The random walk method also solves the "rank sink" problem of previous methods by disallowing any single traversal from visiting any particular node more than once within a certain interval.

18 Claims, No Drawings

SCORING NODES IN A DIRECTED GRAPH WITH POSITIVE AND NEGATIVE LINKS

CROSS REFERENCE TO PROVISIONAL PATENT

This application is based upon provisional patent 61/185,959 filed 10 Jun., 2009.

FIELD OF THE INVENTION

The invention relates to the analysis of linked networks, and in particular assigning scores to nodes based on link structure. These linked networks may represent social networks, linked databases, the world wide web, or any form of hypermedia.

BACKGROUND OF THE INVENTION

Prior to the Internet, the vast bulk of informational and entertainment media consumed by ordinary people was produced by professionals: journalists, musicians, authors, reporters, actors, editors and the like. The high cost and limited capacity of the media acted to encourage a minimum level of quality by dissuading those who could not recover their costs through royalties or advertising.

The world wide web has made publication of nearly any form of text, audio, or visual media cheap and easy for anyone who can afford a computer and basic Internet connectivity. It is often difficult to identify high quality content within the resulting enormous volume of available, variable-quality content. Also, the relative anonymity of the Internet allows some of its users to degrade the experience of others by posting irrelevant, inflammatory, or misleading statements.

Outright censorship, though it may in some situation be effective and justified (such as deleting spam from an on-line forum), is unsatisfactory as a general solution to improving the overall quality of the Internet both because there is no consensus as to what ought to be censored and because no single entity has authority over the content of the entire Internet (or even its most popular application, the World Wide Web).

An alternative to censorship is to assign some sort of score to each document, so that users can distinguish (to a reasonable approximation) the quality of content without close inspection. Rating everything on the Internet would seem to be a daunting task; however Page et. al. [1] observed that the job is considerably easier if we take advanage of the fact that documents often link to each other (especially so on the world wide web) and that, though each document may only contain information about a handful of other documents, when viewed together the links form a directed graph that has a very large well-connected component, and we can make inferences about the quality of documents within that well-connected component by the structure of their links to the whole.

PageRank[1] has been employed in this fashion by Google to make high quality content easier to find on the world wide web by ranking the relative importance of web pages and displaying higher-ranked pages more prominently within their seach engine. We find it important to note, though, that PageRank may be applied to other entities besides collections of web pages, or even documents. For instance, it is particularly well suited to social networks, in which each node in the graph represents a particular user, and links between nodes represent trust relationships. One of the great strengths of the Internet is that large groups of relatively anonymous people can work together to achieve a common purpose, whether writing open-source software or playing multiplayer online games. However, In large communitities, it can be difficult to identify contributing members, but we can apply computational tools to extract this information from a collection of opinions that individual uses hold of each other.

We also at this point would like to distinguish PageRank, the present invention, and similar reputation systems from a similar category of methods, recommender systems. Grouplens is an example of the latter[2]. The input to a recommender system is a collection of ratings of the form "Entity X gives entity Y a rating of N", in which X is typically a user of the system and Y is typically anything but a user (such as a song, a book, or a movie), and N is some numerical or symbolic value (most commonly 1,2,3,4,5 or "thumbs up/thumbs down"). Recommender systems find users that share similar opinions as a given user, and thus provide recommendations for that user ("people who like this thing also like these other things . . . "). However, they do not provide a mechanism for users to directly rate other users, and this limitation makes them relatively vulnerable to ballot-stuffing attacks [3].

SUMMARY OF THE INVENTION

PageRank has two limitations which are addressed by the present invention. Firstly, PageRank has no notion of a negative links, only positive links.

The fundamental intuition of PageRank is that a friend of a friend is also a friend; if a particular node has some amount of reputation, it is bestowed (though reduced by being divided amongst multiple users) also on all of his/her friends, and their friends, etc. . . .

Negative reputation, however, does not work in the same way; an enemy of an enemy is not necessarily an enemy. In fact, basing your own notion of trust on your enemy's preferences is highly suspect. So we can't simply run PageRank on the graph of negative links and expect a meaningful result.

However, we can obtain a useful result if we restrict ourselves to a single hop along the distrust links and then propagate the negative reputation along positive links in the reverse direction. This can be summed up as two basic rules: an enemy of a friend is an enemy, and someone who considers an enemy a friend is also an enemy. In our method, we distinguish between negative reputation that a node accrues from direct negative links (which we call "distrust") and negative reputation that a node accrues by establishing positive links to nodes with poor reputation (which we call "gullibility"). (It is worth noting that the first of these rules is not novel, see for instance [4].)

The present invention includes two distinct strategies to compute the trust, distrust, and gullibility scores of a given node. One is a deterministic iterative method that converges closer to the final solution with every iteration. The other is a random walk that adheres to certain rules. The result for a given node is determined by the number of visits to that node, where the traversal can be in one of three states. Given enough time, the solution produced by either strategy will converge towards the same solution, though in the case of the random walk, we can modify the traversal in a way that produces better results.

This modified traversal resolves a second limitation of PageRank, which artificially inflates the score of groups of nodes in small, closed loops. Pagerank can easily be implemented in a way that disregards links from a node to itself. However, small loops in the graph with no exit have much the same effect as a self-link, and to break these tight loops by removal of certain links would be to discard a valuable part of the link structure. Pagerank employs a "damping factor" (see [1] for details) that mitigates the effect of these loops.

Our modification is to disallow the random walk from revisiting a recently visited node, in effect preventing it from traversing a loop, thus fixing the loop inflation problem in a more direct way than using a damping factor.

DESCRIPTION OF PRIOR ART

PageRank is a well-known patented reputation system.
U.S. Pat. No. 6,285,999—Page (2001)

PageRank has been extended in a number of interesting ways. Guha et. al. extend PageRank to produce a two dimensional reputation value for positive and negative reputation [4]. They suggest single step propagation from a trusted node to a distrusted node (i.e. an enemy of a friend is an enemy), which is something we do as well in the present invention. They apply a further multiple-propagation step from distrusted node to distrusted node (i.e. an enemy's enemy, or an enemy's enemy's enemy ad nauseum is also an enemy). They state that this solution is unsatisfactory, but offer no alternative.

Kerchove and Dooren account for negative links by using a method that simulates the behavior of a random surfer that accrues a "blacklist" of distrusted nodes, taken from the negative links of the nodes it visists, as it traverses the node graph [5]. If it arrives at a node it distrusts, it does not visit that node but rather jumps to a random node.

Kunegis et. al. use a handful of different methods [7], the one most similar to ours (section 6.3.3) treats links as signed values, and multiplies the links in a path together to determine one node's opinion of another. Thus, an enemy of an enemy is a friend, and an enemy of an enemy of an enemy is an enemy.

Anderson, et. al. describe a hybrid between a recommender system and a reputation system, which uses the link structure of a social network to produce a rating for an item rated by some of the users which weights the influence of users based on their proximity to some chosen user.
U.S. Pat. Application No. 2009/0112989—Anderson, Borgs, Chayes, Feige, Flaxman, Kalai, Mirrokni, Tennenholtz—(2009)

Ramer et. al. describe targeting advertising to mobile devices based on that user's influence in one or more social networks 7. Targeting advertising to highly influential members of a social network might cost more. They offer many influence metrics, but most are based on monitoring the user's behavior rather than analyzing the link structure of the social network. As an example of the latter, they suggest counting the number of friends a particular user has as one option.
U.S. Pat. Application No. 2008/0214148—Ramer, Soroca, Doughty—(2008)

BENEFITS OF THE INVENTION

PageRank accounts for positive opinions but not negative opinions. Consequently, the score of any particular node is not so much a measure of quality as a measure of popularity. If a particular node has a high rank, it is difficult to distinguish if it is universally well liked, or simply well known; it may even be almost unanimously disliked. This works well for web search; relevance and quality often correlate well enough to satisfy users. However, many applications (such as social networks) would benefit from an algorithm that was more discerning.

By providing a notion of negative reputation in addition to the positive, one can get a better idea of the quality of a particular node by looking at the ratio of the two in addition to the absolute magnitude:

We also find it useful to distinguish between two different kinds of negative reputation. The most straightforward is the ill-repute a node accrues through negative links from trusted nodes, which are an indication that the node is misbehaving in some way. We call this "distrust". We also recognize a different kind of negative reputation that penalizes a node for trusting untrustworthy nodes. This other kind of negative reputation we call "gullability". Gullability serves as an indication to other nodes that they should think carefully before adding that node to their list of trusted nodes.

PageRank has another defect regarding the artificial inflation of the rank of nodes in dead-end loops, which we address in the present invention. PageRank properly accounts for a simple dead end (a node with no outlinks) by treating it the same as if it were a node with an outlink to every node (or to a certain globally-defined subset of trusted nodes). These dead end nodes contribute little to their own reputation, rather it goes into a sort of "common pool". We presume that nodes are also not allowed to link directly to themselves.

However, if we have two nodes A and B that link to each other, and no one else, and we have links leading in to either A or B from outside, then A and B reinforce each other's reputation in much the same way as a single node would if it were allowed to link to itself.

Page, Brin, Motwani, and Winograd in the original PageRank paper[1] identified this as a problem and called these loops "reputation sinks".

Such two-node (and larger) loops could be removed by a pre-processing step, but to do so would be to throw potentially valuable information away, and may require arbitrary dicisions about which link to delete.

Page et. al. mitigated the effect of these sinks by introducing a damping factor (referred to as .alpha. in U.S. Pat. No. 6,285,999). This does not solve the problem outright, but it does impose an upper bound on the reputation inflation of these loops.

We employ a random walk similar to PageRank's "random surfer" method, but with an additional constraint that the random walk is not allowed to visit any node more than once between random jumps (with one minor exception). This nicely resolves the loop inflation problem without throwing away any of the link structure.

We also describe how the random walk method can be extended to generate a triple-valued reputation value such as previously described, but without the reputation sink problem.

If we aren't concerned about reputation sinks, we present another method that converges much quicker. Which of the two methods to use is a tradeoff between computational resources and quality of the results.

We think it important at this point to include a few remarks on the morality of computing negative reputation. There are good reasons to believe that it is not universally a good idea for a reputation system to support negative links—essentially a way of saying "I hate you". One could argue that this world has enough animosity already without building tools to spread it around, and making these tools a part of the average person's online experience.

We anticipate two particular risks. One is that a malicious user or group of users of a reputation system will use negative links as just one more tool to antagonize other users. The other, more subtle danger, is that many non-malicious users will defer to the reputation system in some cases where they would be better to trust their own judgement.

Regarding the first risk, our hope is that malicious users (i.e. "griefers") are in the minority. We believe this is true of most online communities unless nearly all of the regular users have been driven away by the griefers. If the griefer's social network is not supported by positive links from a large part of the user base, the system is contrived in such a way that their influence will be insignificant, and the harm they can cause to other's reputations will be limited.

Alternatively, supposing the online community is dominated by griefers, or perhaps it just contains sub-communities that don't agree with the views of the majority, the reputation system can still accommodate the minority by calculating more than one solution, with each solution biased to favor a certain node or group of nodes. By computing reputation scores in this manner, with results tailored for each user or group rather than attempting to produce a global consensus, the community as a whole can accommodate a variety of conflicting views and is less likely to become a monoculture.

Regarding the second risk, our concern is that certain users who have accrued some amount of negative reputation either through no fault of their own or from deeds they have since repented of, will be shunned and unable to gain any positive reputation. Though we prefer those we interact with on a daily basis to be patient and generous and kind and forgiving, the reputation system we describe is (by deliberate design) strict and harsh and unyielding. If users simply accept and act on the results of the reputation system uncritically, they may create for themselves an insular culture, distrustful of outsiders, isolated from those who hold different views, and quick to cast any from their midst who don't get along with all their friends.

The fundamental problem, as we see it, is that our method is meant as a approximation of the social defense mechanisms groupns people employ on a smaller scale, in small social groups, often without conscious thought, such as the sense of distrust one might feel for a person who is distruted by one's friends. However, it does not account for the discipline posessed by people to varying degrees to disregard those feelings of distrust at appropriate times and make an exception. In order for an online community to function well, users will need to learn when to pay attention to the reputation system and when to draw their own conclusions.

DETAILED DESCRIPTION

In the following description, we will describe the present invention in terms of the format of its input and output, and then we will present several methods to perform the actual computation, each with different performance characteristics and properties.

The input of the system is a directed graph with labelled nodes, and arcs between nodes are of two types, either positive or negative. This graph may be taken from a social network of some kind, or a database of linked documents. The World Wide Web presently has no standard way to indicate a negative link, but this may not always be true. Another potential source of an appropriate graph is a distributed computer system such as BitTorrent, in which individual computer systems share data with each other in a tit-for-tat strategy. It should be apparent that input graphs may come from a wide variety of sources, not all of which could be forseen presently. We consider the source of the graph to be largely outside the scope of the present invention, and will for brevity simply refer to the input graph as a social network.

The input graph may also be represented in several ways. The simplest would be an N×N matrix (N being the number of nodes in the graph), with each entry representing a link; either 1 for a positive link, −1 for a negative link, or 0 for no link. This requires $O(N^2)$ memory.

We prefer to use a sparse representation, in which we represent the link graph as an augmented adjacency list. Each node is represented as a record containing an identification of some kind (as determined by the application) and four sets of references to other nodes: the forward and back links, both positive and negative. We don't use all four of those in every method we are about to describe, so certain sets may be omitted for some of the methods.

We will refer to a node's collection of positive and negative links to other nodes as "Node[n].FwdPos" and "Node[n].FwdNeg" respectively, for some node n. Backlinks (links that point to the present node) will be called "Node[n].RevPos" and "Node[n].RevNeg".

Sometimes, we will need to know the number of forward links out of a node, and the number of positive backlinks into it so we will precompute those and store them as "Node[n].FwdCount" and "Node[n].RevCount":

Node[n].FwdCount = length (Node[n].FwdPos) + length (Node[n].FwdNeg)
Node[n].RevCount = length (Node[n].RevPos)

Where "length" returns the number of elements in a set.

Sets of links may use any reasonable set data structure, but we currently prefer arrays, as we can access the Nth element in O(1) time. A reasonable optimization would be to use linked lists when constructing the sparse graph, then promote the lists to arrays.

Our input will also include a set of trusted nodes, "T". These essentially get a certain amount of positive reputation "for free". If we wish to compute a generic view of the social network, in which no node is treated any differently than any other, then we can set every node as trusted. Unfortunately, Cheng and Friedman show such a universal consensus is succeptible to ballot stuffing attacks if an adversarial user is able to create new nodes cheaply [6].

We may also compute a view of the social network from the point of view of a particular node; in that case, we would set only that one node as trusted. A view of the network tailored to a particular user is less succeptible to ballot stuffing attacks.

For large graphs (millions of nodes), computing a unique solution for every user may be impractical, but for, say, tens of thousands of nodes or less, it may be a practical thing to do. A possible tradeoff is to create a view based on some group of nodes being selected as trusted, such as a guild in an online game.

Additionally, input will include three damping factors: Tdamp, Ddamp, and Gdamp.

Our output view will be a collection of reputation values, one for each node. Our present prototype uses an array of reputation values, along with an auxiliary balanced tree that maps node identifiers to array indices, though for the purposes of this discussion we will treat each node as being uniquely identified simply by its array index. A reputation value consists of three floating point numbers, denoted collectively as "(T,D,G)" for some trust value T, distrust value D, and gullibility value G. Individually, we will refer to them simply as Trust, Distrust, and Gullibility. The Collection of reputation values we will call "Rep" and the value corresponding to the Nth node we will denote "Rep[n]"

We provide several methods to perform the necessary computation to produce an output view. First, we will describe a deterministic, iterative process in which each node's reputation contributes to or detracts from the reputation of the nodes it is linked to according to a simple formula. The total reputation in the system remains constant, and as it "flows" from one node to the next, eventually the whole system will convenge towards a solution.

Next, we will present a nondeterministic process that performs a random walk on the graph, according to certain rules. This method does not take negative links into account. Positive reputation is proportional to the number of visits to a given node.

Finally, we will present a variation of the random walk process that does take into account negative links. The random walk at any time will be in one of three states, and these correspond to the three reputation values. Rather than a single visit counter for each node, we will mainain three counters, one for each state. As before, the amount of one type of reputation is proportional to the value of that node's hit counter corresponding to that reputation type.

Deterministic Method:

This method begins with Rep, a collection that contains a reputation value for each node. We will produce a new version of Rep from the current version, replace the current version with the new version, and repeat as many times as necessary to ensure adequate convergence. Each iteration will, on average, differ from the previous iteration less and leess until the system stabilizes and the divergence becomes insignificant. (We find that this happens in less than 100 rounds with a network of around 80,000 nodes.) We can either terminate the iteration when the difference between the previous round is below a threshold, or when we have reached a fixed number of rounds.

An initial trust value of one divided by the number of trusted nodes is assigned to all trusted nodes. For all untrusted nodes, we used (0,0,0).

```
Rep[n] = (1/(Length T),0,0) for all n in T
Rep[n] = (0,0,0) for all n in Node and not in T
```

We will also have an value, not associated with any user, for "leftovers".

Leftovers =0

At a high level, our main loop will look like this:

```
CurRep = Rep
while (termination criteria not reached)
    Leftovers = 0;
    for all n in Nodes
        NewRep[n] = (0,0,0)
        contrib(n)
    for all n in T
        contrib_leftovers(n)
    CurRep = NewRep
FinalRep = CurRep
```

Nodes contribute reputation to each other based on their links. The contribution of a particular link for a given round is the source node's relevant reputation in the previous round divided by the number of out-links (both positive and negative) and then scaled by one minus the appropriate damping factor.

The total amount of reputation would decrease over time if we failed to balance out the damping factor in some way, so when we compute a link's contribution, we also contribute an appropriate amount into the leftover bin to be redistributed later.

The contribution of a positive link works out like this:

```
contrib_trust (src, dst) =
    t = CurRep[src].Trust
    contrib = t / Node[src].FwdCount
    NewRep[dst].Trust += contrib * (1−Tdamp)
    Leftovers += contrib * Tdamp
``` distrust is similar, but we pull from the source node's trust value and convert it into distrust on the target node:

```
contrib_distrust (src, dst) =
    d = CurRep[src].Trust
    contrib = d / Node[src].FwdCount
    NewRep[dst].Distrust += contrib * (1−Ddamp)
    Leftovers += contrib * Ddamp
```

For gullibility, we propagate distrust and gullibility in the reverse direction, from the target node to the source node.

```
contrib_gullibility (src, dst) =
    dg = CurRep[dst].Distrust + CurRep[dst].Gullibility
    contrib = dg / Node[dst].RevCount
    Rep[src].Gullibility += contrib * (1−Gdamp)
    Leftovers += contrib * Gdamp
```

We can update all three kinds of reputation at once for a particular node:

```
contrib(n) =
    contrib_trust (src, n) for all src in Node[n].RevPos
    contrib_distrust (src, n) for all src in Node[n].RevNeg
    contrib_gullibility (n, dst) for all dst in Node[n].FwdPos
```

Once we are done computing the link contribution for all nodes, we can distribute the leftovers. Each trusted node gets an equal share of the leftovers, accounted as trust.

```
contrib_leftovers (n) =
    if n is a member of T
        Node[n].Rep[r].Trust += Leftovers[r−1] / length (T)
```

When finished, we may simply output the reputation value from the final round for each node. If correctly implemented, the total reputation values should sum to one (which was the quantity of reputation we started with). If the final totals are weighted more towards trust, distrust, or gullibility than desired, one may adjust the damping factors. (A value of 0.15 seems popular for plain pagerank, and we see no reason to change that without good reason. Damping factor values set too high will result in reputation not propagating much beyond a few hops. Values of Tdamp and Gdamp too close to 0 will cause reputation to tend to get "stuck" in loops, and the latter will also tend to result in reputation values heavily skewed toward gullibility.)

A few things about this method are worth additional comment. Though in the method presented, we iterate over all nodes, calculating each node's reputation based on the contributions from various sources (the incoming reputation), it is equally valid (and within the scope of this method) to iterate over all nodes and calculate each node's contribution to its neighbors (the outgoing reputation).

While the method presented gives equal weight to all of a node's links, one could just as well implement an uneven distribution, for instance with new links being weighted heavier than old links. Similarly, the reputation values output by this method will typically be scaled by some factor before being presented to the user.

Random Traversal Method

PageRank may be implement as described in method 1 above if we omit the treatment of negative links, distrust, and gullibility. An alternative implementation is the "random surfer model" in which a program (or multiple programs running in parallel) performs a random walk on the link graph. It begins at a node chosen at random from among the trusted nodes, then it follows outward links at random. This continues until either the random surfer process arrives at a node with no outward links (a dead end), or it may terminate early at each step with probability equal to the damping factor. In either case, it starts over at the beginning, choosing another node randomly from among the trusted nodes and repeating. (This is sometimes called "zapping", and we will adapt that nomenclature.)

As the "random surfer" proceeds, the number of visits to any particular node divided by the total number of node visits converges towards the probability that a random surfer will be at that node at any particular time, which is proportional to that node's pagerank. Note that the random surfer method may proceed for any length of time, and we assume that some stopping criteria exists (such as a length of time, or a certain number of node visits or a certain number of zaps).

Both variations of PageRank and the Method presented above all suffer from artificially increased rank for small groups of mutually-linked nodes. We don't believe that a node should be able to elevate its own rank by linking to a node that links right back.

The method will describe presently is very similar to the random surfer method, save that the random traversal is not allowed to visit a node that it has already visited since the last zap. There are several ways to store the history of a traversal to prevent it from re-visiting a node: We could maintain state within the traversal, perhaps a hash table or red/black tree of visited nodes, or we could give each traversal its own unique tag, and associate it with each node along with the visitation counter. We will use the fader method in our example code. (Our prototype maintains a red/black tree within the traversal.)

The node graph and set of trusted nodes T is the same as in the previous deterministic method. We will also maintain a visitation counter and a tag associated with each node. We recommend not storing these within the graph itself, but to use an auxiliary data structure. The reason is to make it easier for multiple threads to execute traversals in parallel without interfering with each other.

Our random walk may be implemented like so:

```
Counter = 0
Total_visits = 0
forall n in Nodes
    Tag[n] = 0
    Visits[n] = 0
    goto zap
zap:
    if (termination criteria is true)
        goto done
    else
        Counter = Counter+1
        n = select random node from T
        goto visit
visit:
    r = random(0,1)
    if r < Tdamp
        goto zap
    else
        Tag[n] = Counter
        Visits[n] += 1
        Total_visits += 1
        next =   select random node from Node[n].FwdPos
                 such that Tag[next].Tag != Counter
        if (no suitable next node)
            goto zap
        else
            n = next
            goto visit
done:
    forall n in Nodes
        FinalRep[n].Trust       = Visits[n] / Total_visits
        FinalRep[n].Distrust    = 0
        FinalRep[n].Gullibility = 0
```

Here, random(0,1) is a random floating-point value between 0 and 1. We assume "/" represents floating point division, even though both operands may be integers.

Random Traversal with Distrust:

The random traversal given above doesn't suffer from the same reputation sink problem as PageRank, but it does not account for negative links. Now, we will present a variation on the random traversal which produces Setup is similar to the random traversal method, but we make use of negative links to compute negative reputation. The results are very similar to the deterministic method, but don't suffer from the rank sink problem.

Unlike the previous random traversal, the augmented traversal may be in any of three states. When this zaps, it returns to a "trust" state in which it increments the trust values of each node it visits. However, when it chooses a new node to visit, it may either chose to follow a positive link or a negative link. If positive, it remains in the trust state and continues as usual. If it choses a negative link, it switches to a "distrust" state, and increments the distrust counter of the node it visits. It then transitions to "gullability" state and follows random back-links from the distrusted node until it meets a dead end or zaps.

```
Counter = 0
Total_visits = 0
forall n in Nodes
    Tag[n] = 0
    Visits[n].Trust       = 0
    Visits[n].Distrust    = 0
    Visits[n].Gullibilit  = 0
goto zap
zap:
    if (termination criteria is true)
        goto done
    else
        Counter += 1
        n = select random node from T
        goto trust_visit
trust_visit:
    r = random(0,1)
    if r < Tdamp
        goto zap
```

-continued

```
            else
                Tag[n] = Counter
                Visits[n].Trust += 1
                Total_visits += 1
                next =    select random node from Node[n].FwdPos
                          or Node[n].FwdNeg such that
                          Tag[next] != Counter
                if (no suitable next node)
                    goto zap
                else
                    n = next
                    if next was selected from FwdPos
                        goto trust_visit
                    else
                        Counter = Counter+1
                        goto distrust_visit
    distrust_visit:
        r = random(0,1)
        if r < Ddamp
            goto zap
        else
            Tag[n] = Counter
            Visits[n].Distrust += 1
            Total_visits += 1
            next =    select random node from Node[n].RevPos
                      such that Node[next].Tag != Counter
            if (no suitable next node)
                goto zap
            else
                n = next
                Counter = Counter+1
                goto gullabilitiy_visit
    gullability_visit:
        r = random(0,1)
        if r < Gdamp
            goto zap
        else
            Tag[n] = Counter
            Visits[n].Gullability += 1
            Total_visits += 1
            next =    select random node from Node[n].RevPos
                      such that Node[next].Tag != Counter
            if (no suitable next node)
                goto zap
            else
                n = next
                goto gullability_visit
done:
    forall n in Nodes
        FinalRep[n].Trust        = Visits[n].Trust / Total_visits
        FinalRep[n].Distrust     = Visits[n].Distrust / Total_visits
        FinalRep[n].Gullibility  = Visits[n].Gullibility /
                                   Total_visists
```

In the example above, each state transition increments "Counter", which means that if, for instance, a given traversal visits a node in the "trust_visit" subroutine, it may visit it again within the "distrust_visit" or "gullability_visit" subroutine. We think this is sensible behavior, but an embodiment of the method which only allows one visit to each node between "zap"s is also reasonable.

REFERENCES CITED

[1] Page, Brin, Motwani, and Winograd. The PageRank citation ranking: Bringing order to the Web. Stanford tech report, 1999.
[2] Method for node ranking in a linked database U.S. Pat. No. 6,285,999
[3] Lam, Riedl. Shilling Recommender Systems for Fun and Profit. WWW, 2004.
[4] Guha, Kumar, Raghavan, Tomkins. Propagation of Trust and Distrust. WWW, 2004.
[5] Massa, Hayes. The PageTrust algorithm. How to rank web pages when negative links are allowed? Web Intelligence, 2005.
[6] Sybilproof reputation mechanisms. SIGCOMM P2P Econ, 2005.
[7] Kunegis, Lommatzsch, Bauckhage. The Slashdot Zoo: Mining a Social Network with Negative Edges. WWW, 2009.

What is claimed is:

1. A method of determining a multidimensional reputation score for each node in a directed graph, comprising:
providing, to a computer, the directed graph comprising a plurality of nodes, a plurality of positive links and a plurality of negative links, wherein each of the plurality of nodes represents an autonomous entity and each of the plurality of positive and negative links represents a positive or negative opinion which a source node of each link holds of a target node of each link, respectively,
generating, by the computer, an initial estimate of a reputation score for having at least a value of positive reputation, a value of negative reputation, and a value of gullibility wherein the gullibility value is a separate kind of negative reputation accrued by a node by establishing positive links to nodes with negative reputation;
updating, by the computer, the initial estimate of the reputation score of each node for one or more rounds wherein
each node's positive incoming links contribute to that node's positive reputation score in proportion to the positive reputation score of the source of that positive link in the immediately previous round, and
each node's negative incoming links contribute to that node's negative reputation score in proportion to the positive reputation score of the source of that negative link in the immediately previous round;
each node's positive outgoing links contribute to that node's gullibility score in proportion to some weighted combination of the negative reputation score and the gullibility score of the target of that positive link in the immediately previous round;
and
returning from a last round, by the computer, a final reputation score for one or more nodes wherein the returning comprises:
producing the final reputation score for each node which includes a gullibility score.

2. The method of claim 1, where the directed graph represents relationships between users of a multiplayer online computer game, wherein the nodes represent the users, and the links represent the relationships.

3. The method of claim 1, where the directed graph represents relationships between users of an online forum, wherein the nodes represent the users, and the links represent the relationships.

4. The method of claim 1, where the directed graph represents relationships between computers connected to a common peer-to-peer service, wherein the nodes represent the computers, and the links represent the relationships.

5. A method of determining a reputation score for each node in a directed graph comprising:
providing, to a computer, the directed graph comprising a plurality of nodes, and a plurality of links, wherein each of the plurality of nodes represents an autonomous entity and each of the plurality of links represents a positive opinion which a source node of that link holds of a target node of that link,
generating, by the computer, a reputation score for each node having at least a value of positive reputation
by performing one or more random traversals and counting visits to each node by incrementing a per-node counter wherein a generating comprises:

counting at most one visit to each node per traversal, so that a reputation score of a particular node is not increased by having a link to other nodes that links back to the particular node, and returning a final reputation score for the particular node, wherein the final reputation score is a value of the counter of the particular node divided by a sum of counters for all of the plurality of nodes.

6. The method of claim 5 wherein each node's final score is further modified by multiplying the score by the total number of nodes in the directed graph.

7. The method of claim 5, wherein when a node is visited during a particular traversal, the node is removed from consideration as a candidate destination node for a remainder of the traversal.

8. The method of claim 5, wherein during a particular traversal, counters for all visited nodes are each incremented only once, regardless of whether a node was visited more than once.

9. The method of claim 5, where the directed graph represents relationships between users of a multiplayer online computer game, wherein the nodes represent the users, and the links represent the relationships.

10. The method of claim 5, where the directed graph represents relationships between users of an online forum, wherein the nodes represent the users, and the links represent the relationships.

11. The method of claim 5, where the directed graph represents relationships between computers connected to a common peer-to-peer service, wherein the nodes represent the computer, and the links represent the relationships.

12. A method of determining a multidimensional reputation score for each node in a directed graph, comprising:

providing, by to a computer, the directed graph comprising a plurality of nodes, a plurality of positive links and a plurality of negative links, wherein each of the plurality of nodes represents an autonomous entity and each of the plurality of positive and negative links represents a positive or negative opinion which a source node of that link holds of a target node of that link, respectively, generating, by the computer, a reputation score for each node having at least a value of positive reputation, a value of negative reputation, and a value of gullibility wherein the gullibility value is a kind of negative reputation accrued by establishing positive links to nodes with negative reputation by performing one or more random traversals and counting visits to each node by incrementing a per-node set of counters, one for each of positive reputation, negative reputation, and gullibility, wherein the generating comprises:

traversing by following links at random in outgoing direction, incrementing positive value counter for all visited nodes until the traversing terminates or traverses a negative link, in response to the traversing traverses the negative link, the traversing increments the negative value counter corresponding to a node which is the destination of the negative link, and proceeds to follow positive incoming links in a reverse direction at random from the destination of the negative link, incrementing a gullibility counter of every node the traversing visits until the traversal terminates; and producing a final reputation score for each node which includes a gullibility score computed in part from gullibility counter for each node, wherein positive links contribute to a source node of the positive links gullibility score in proportion to a negative reputation and gullibility scores of a target node of the positive links, wherein the final reputation score for a particular node comprises of positive value of counter of the particular node, negative value of the counter of the particular node, and gullibility counter of the particular node, each divided by a total sum of all hits of all types for all of the plurality of nodes.

13. The method of claim 12 wherein each node's final score values are further modified by multiplying each by the total number of nodes in the directed graph.

14. The method of claim 12, wherein once a node is visited during a positive incoming stage of a traversal, the node is removed from consideration as a candidate destination node for a remainder of the traversal.

15. The method of claim 12, wherein during a positive incoming stage of a traversal, counters for all visited nodes are each incremented only once, regardless of whether a node was visited more than once.

16. The method of claim 12, where the directed graph represents relationships between users of a multiplayer online computer game, wherein the nodes represent the users, and the links represent the relationships.

17. The method of claim 12, where the directed graph represents relationships between users of an online forum, wherein the nodes represent the users, and the links represent the relationships.

18. The method of claim 12, where the directed graph represents relationships between computers connected to a common peer-to-peer service, wherein the nodes represent the computers, and the links represent the relationships.

* * * * *